United States Patent Office 3,694,162
Patented Sept. 26, 1972

---

3,694,162
APPARATUS FOR ABSORBING GASES IN LIQUIDS
Gunter Kurz, Oberglatt, Karlheinz Otto Laube, Effretikon, and Alfred Adalbert Martinelli, Zurich, Switzerland, assignors to Zellweger Ltd., Uster, Switzerland
Filed Mar. 19, 1970, Ser. No. 21,031
Int. Cl. G01n 31/06
U.S. Cl. 23—253 R      10 Claims

ABSTRACT OF THE DISCLOSURE

Apparatus for absorbing gases in liquids and more particularly the measurement of a constituent of gas mixture for continuous process control and for controlling high-velocity reactions. The apparatus comprises a mixing absorption chamber disposed in a housing, first and second inlet conduit means communicating with said mixing absorption chamber, first and second outlet conduit means communication with said mixing absorption chamber and measuring cell means associated with the first inlet conduit means and the first outlet conduit means for continuously analyzing a sample before it is introduced to and after it is removed from the mixing absorption chamber.

BACKGROUND OF THE INVENTION

The present invention relates to an apparatus for absorbing gases in liquid. More particularly, the present invention is directed to measuring a constituent of gas mixtures for continuous process control and monitoring high-velocity reactions.

In several chemical treatment processes, gas mixtures are reacted with liquids or solids. The concentration in which a certain gas is present in this gas mixture in the gas zone often determines the yield or the reaction mechanism.

A number of processes involve considerable dynamics, in other words, the concentration of reaction gas in the gas zone changes very considerably over a short period of time. If it is intended to keep this gas concentration constant by means of an automatic gas analyzer, the analyzer must be able to detect these rapid changes in concentration at short notice during the process and to transmit the result to a regulator. The regulator then immediately actuates a control valve in a known manner, thus restoring the required gas concentration in the treatment process.

All conventional instruments for the automatic analysis of gases, in which the gas is absorbed by a solution, have an excessively long dead time for high-speed regulating operations such as these.

In one known method for example, ammonia is detected in gas mixtures by absorption in dilute sulphuric acid with the assistance of continuous-cycle conductometric primary elements. However, no effort is made to obtain the result of measurement in as short a time as possible, (i.e., within a matter of seconds) from sampling to measurement.

According to another publication, a gas stream is blown on to a potentiometric measuring chain over which a stream of liquid continuously flows. Although an arrangement of this kind has an extremely short dead time, difficulties are encountered in situations where the gas is to be absorbed in a definite ratio by the liquid.

Another known measuring system also has an extremely short dead time. It embodies a method for the amperometric detection of traces of oxygen and is only suitable for this special case.

SUMMARY OF THE INVENTION

An object of the present invention is to avoid the prior art disadvantages in apparatus utilized for absorbing gases in liquids.

Another object of the present invention is to provide an improved apparatus for measuring the concentration of a constituent of a gas mixture for process control and more particularly to an apparatus for monitoring high-velocity reactions.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved apparatus for absorbing gases in liquids may be obtained by providing a mixing chamber which is accommodated in a housing, wherein a stream of liquid is delivered through a first pipe and a gas stream through a second pipe. Some of the liquid delivered through the first pipe is removed through a first outlet pipe together with the component of the gas stream absorbed in the mixing chamber, while the remainder of the liquid is removed through a second outlet pipe together with the unabsorbed component of the gas stream. A measuring cell is utilized in the delivery pipe and outlet pipe for continuous sample analysis before and after the mixing chamber. This primary element is able to produce a result within a matter of seconds, starting from the sampling of the gas mixture in the treatment process. The particular advantage of the design is that the so-called dead time is shortened as a result of the fact that the sample and reagent stream are accelerated by an increase in the output of metering pumps.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DESCRIPTION OF THE PREFERRED EMBODIMENTS

Figure 1:
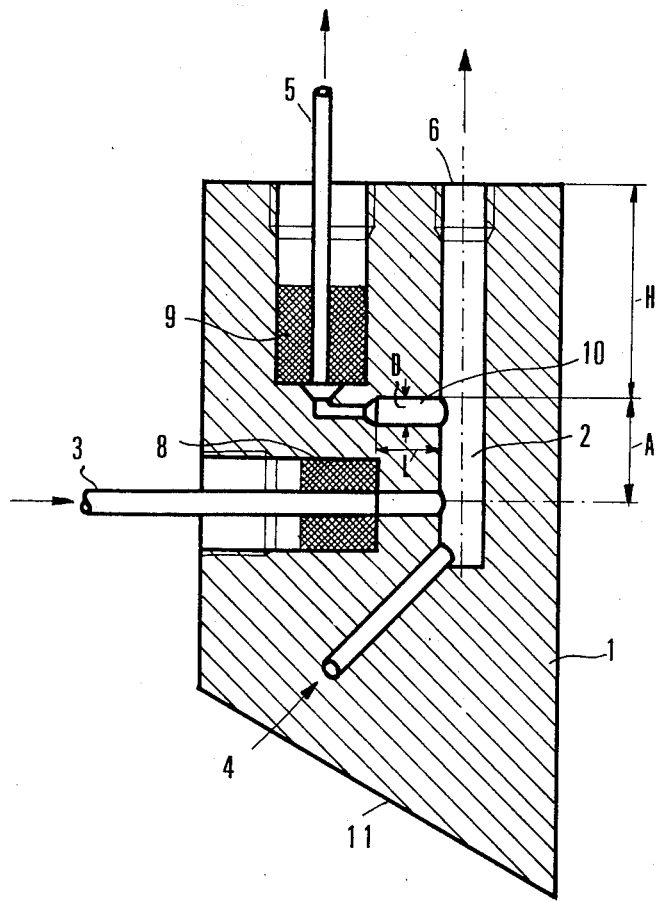
FIG. 1 is a section through the mixing chamber with the delivery and outlet pipes.

The apparatus for absorbing gases in liquid comprises, according to FIG. 1, a housing 1 provided with various conduit means which function as inlet and outlet means and which communicate with the actual mixing chamber 2. A first delivery pipe 3 introduces a liquid into the mixing chamber 2. A gas is introduced through a second feed pipe 4. This second feed pipe is advantageously associated with the mixing chamber so that the material introduced therethrough is introduced substantially tangential to the wall of the mixing chamber with the result that the inflowing gas causes the liquid in the mixing chamber to rotate so that the two media are intimately mixed together. The gas introduced at 4 must consist of at least two components of which one, namely the component to be absorbed, is distinguished by its high solubility in water. This gas component is then absorbed by the liquid while the other component, which is an insoluble component, rises upwards through the mixing chamber in the form of bubbles. For example, the gas to be investigated is in the form of a mixture of 1% by volume of ammonia and 99% by volume of air, ammonia being readily soluble in water and air being substantially insoluble in water.

The housing 1 is provided with another two sockets for outlet pipes. A first outlet pipe 5 is situated laterally offset and adjacent the mixing chamber 2 with which it is connected through a pipe section 10 extending at right-angles from the mixing chamber. The liquid issuing through 5 contains the absorbed ammonia. Said liquid passes through the measuring cell 9 where the electrochemical change relative to the measured value of measuring cell 8 is determined.

A second outlet pipe 6 leads out of the extended or elongated mixing chamber 2. The air which is not absorbed in the liquid rises upwards through the mixing chamber 2 and is removed through the outlet pipe 6.

The difference in level A between the delivery pipe 3 and the pipe section 10, the height H of the pipe section situated above the actual mixing chamber and the length L and diameter D thereof are important to the effectiveness of absorption in the mixing chamber and the removal of the excess quantity of gas through the outlet pipe 6. The object of the special arrangement of the measuring cell 9 in a pipe section laterally offset relative to the mixing chamber 2, is to obtain a bubble-free stream of liquid through the outlet pipe 5 so that a stable exact measurement is obtained in the measuring cell 9. In addition, the widening (D) of the pipe section 10 along a length L serves to ensure that the liquid flowing through the measuring cell 9 initially has a low rate of flow, thus preventing air bubbles from being entrained from the mixing chamber.

In order to shorten the so-called dead time, i.e. the time required to cover the distance from entry into the mixing chamber 2 up to the measuring cell 9, all the channels used to deliver and guide the liquid are made as narrow in diameter as possible.

In order to further improve separation of the excessive gas component from the liquid, which passes through the measuring cell 9, the housing 1 is advantageously mounted in an inclined position indicated in FIG. 1 by the sloping housing wall 11. As a result, the mixing chamber 2 is situated above the pipe section 10 which now leads away obliquely downwards. Accordingly, the free gas bubbles have a tendency to rise up along the chamber wall remote from the socket for the pipe section 10 so that they cannot enter the outlet pipe 5.

Figure 2:
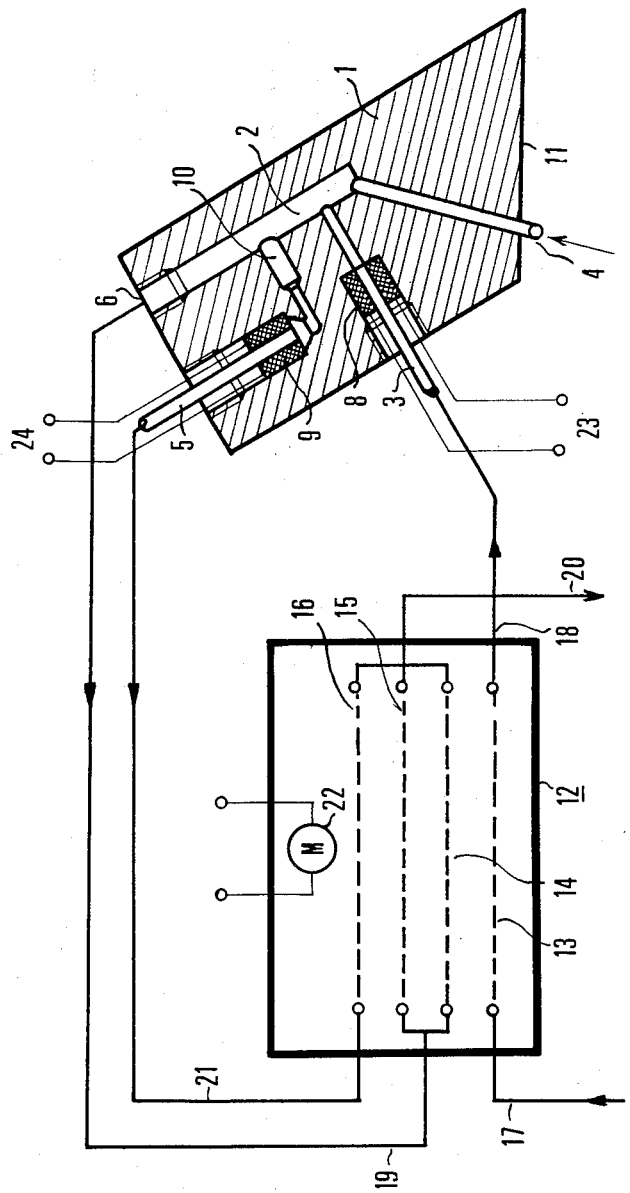
FIG. 2 shows the measuring cell co-operating with a metering pump.

FIG. 2 shows the apparatus according to the present invention in conjunction with a pump associated therewith for controlling the liquid and gas streams.

A peristaltic pump is advantageously used as the pump. In pumps of this kind, several separate liquid or gas streams can be delivered at a constant delivery volume.

In the present situation, the pump 12 has four parallel pressure hoses 13, 14, 15, 16, which communicate with the absorption chamber as follows:

The reagent is delivered to the pump at 17, is forced to the right in the hose 13 and flows through the outlet 18 to the feed pipe 3 of the mixing chamber 2. The gas to be analyzed and absorbed in the reagent (for example ammonia in air) is delivered to the feed pipe 4 in the absence of excess pressure.

The outlet pipe 5 communicates with the inlet 21 of the pump which draws the bubble-free liquid containing the absorbed gas out of the mixing chamber 2 through the pipe section 10 and through the measuring cell 9.

The outlet pipe 6 communicates with the inlet 19 formed by two parallel hoses 14, 15, and draws excess liquid off together with the undissolved gas component. The outlets of the hoses 14, 15, 16, are again arranged parallel to one another and convey the liquid and gas streams coming from the absorption unit outwards through the pipe 20.

The reference 22 denotes the motor utilized for driving the peristaltic pump 12.

The measuring cells 8 and 9 are connected to the terminals 23 and 24 to which suitable indicating instruments can be connected. The measuring cells can be in the form of conductivity cells, cells for photometric measurements, direct-potentiometric primary elements or other suitable physical-chemical detectors. The measuring cell 8 may be used, for example, to control the quality of the solvent fed in at 3. If the cells 8 and 9 are two conductivity cells, the conductivity of the solution of the gas formed in the solvent can also be obtained for example by differential measurement. This conductivity is a measure of the concentration of the gas to be measured in the treatment process and may be used for regulation.

By co-ordinating the output of the individual pressure hoses in cases where peristaltic pumps are used, or by using corresponding members where other pump systems are used, it is possible to obtain different changes in the conductivity of the water flowing through the measuring cell 9, in dependence upon the concentration of the soluble gas in the gas mixture. For example, the following relative outputs can be used:

A unit of volume per unit of time is drawn off by the outlet pipe 5 through the hose 21. Four times the unit volume per unit of time is delivered through the hose 13. The difference, i.e., three times the unit volume, thus has to flow off through the outlet pipe 6. As shown in FIG. 2, the outlet pipe 6 communicates wtih the parallel hoses 14, 15. Their internal diameters are each, for example, three times larger than that of the hose 16 so that these hoses control an output of $2 \times 3^2 = 18$ volume units. Thus, in addition to the three aforementioned volume units, another 15 volume units have to be additionally discharged through the outlet pipe 6. However, according to the connection plan shown in FIG. 2, this is only possible if the additional volume is taken in under suction through the gas delivery pipe 4. Accordingly, the relative quantity of the soluble gas component delivered to the mixing chamber 2 for absorption in the liquid can be controlled by dimensioning the pump section communicating with the outlet pipe 6.

Figure 3:
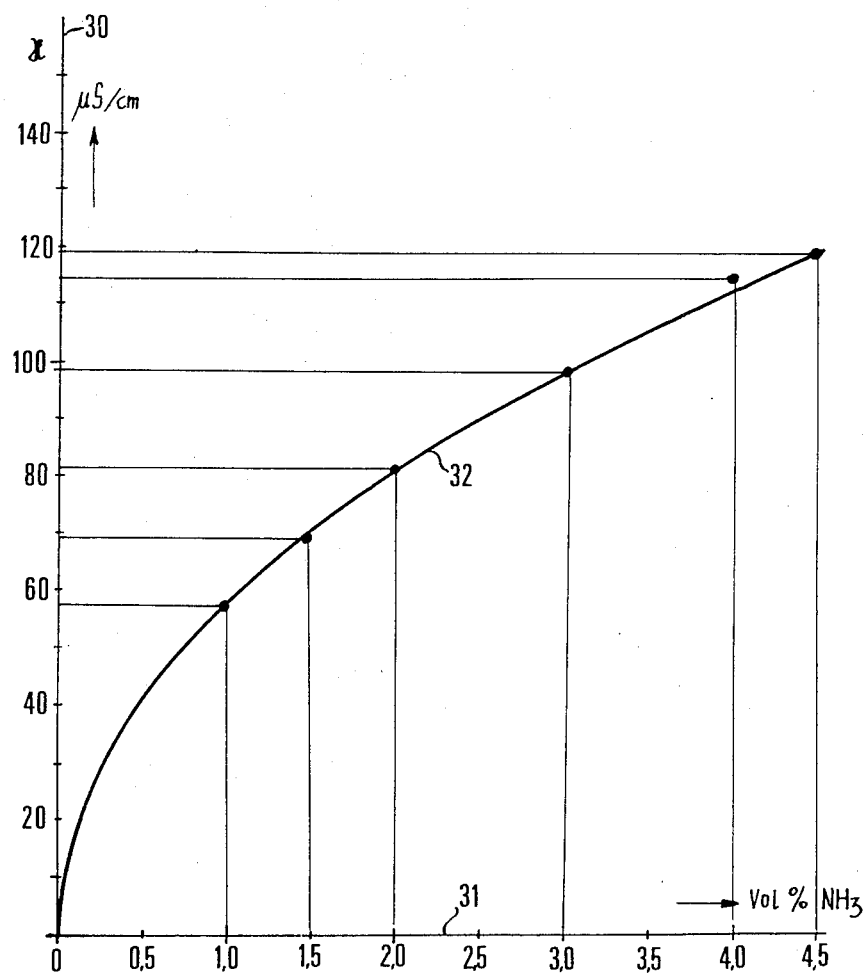
FIG. 3 is a graph illustrating the dependence of conductivity upon the gas component being investigated.

The graph shown in FIG. 3 illustrates the dependence of the conductivity $\chi$, which can be measured in the measuring cell 9, upon the component by volume of the water-soluble gas (ammonia) from the overall volume. The conductivity $\chi$ is plotted on the ordinate 30, and the ammonia concentration on the abscissa 31. The curve 32 is the result of a series of investigations at a predetermined delivery ratio for the range from about 0 to 4.5% by volume of ammonia in air.

The invention being thus described, it will be obvious that the same may be varied in many ways. Such variations are not to be regarded as a departure from the spirit and scope of the invention, and all such modifications as would be apparent to one skilled in the art are intended to be included.

What is claimed is:

1. An apparatus for absorbing gases in liquids which comprises an absorption mixing chamber disposed in a housing, first and second inlet conduit means communicating with said absorption mixing chamber, the second inlet conduit means communicating with the lower portion of the mixing chamber substantially tangential to its wall, first and second outlet conduit means communicating with said absorption mixing chamber, and measuring cell means for continuously analyzing a sample in the first inlet conduit means before it is introduced to the absorption mixing chamber and for continuously analyzing the sample in the first outlet conduit means after it is removed from the absorption mixing chamber.

2. An apparatus for absorbing gases in liquids which comprises an absorption mixing chamber disposed in a housing, first and second inlet conduit means communicating with said absorption mixing chamber, first and second outlet conduit means communicating with said absorption mixing chamber, the first outlet conduit means being laterally offset and adjacent to the mixing chamber, said first outlet means communicating with the absorption mixing chamber through a third conduit means extending at right angles from said absorption mixing chamber, and measuring cell means for continuously analyzing a sample in the first inlet conduit means before it is introduced to the absorption mixing chamber and for continuously analyzing the sample in the first outlet conduit means after it is removed from the absorption mixing chamber.

3. The apparatus of claim 2, wherein the first inlet conduit means communicates with the absorption mixing chamber substantially perpendicular to its wall.

4. The apparatus of claim 2, wherein the second outlet means is a conduit means axially extending from the absorption mixing chamber.

5. The apparatus of claim 2, wherein the third conduit means is provided with an enlarged diameter portion extending for a distance from the absorption mixing chamber toward the first outlet conduit means.

6. The apparatus of claim 2, wherein the housing is provided with a sloping wall to facilitate mounting the housing in an inclined position.

7. The apparatus of claim 2, further comprising pump means for introducing a reagent to the first inlet means and drawing a bubble-free liquid containing absorbed gas and any excess gas component from the first and second outlet conduit means, respectively.

8. The apparatus of claim 7, wherein the pump means is a peristaltic pump which is capable of delivering several streams at a constant volume, said pump being provided with a motor means.

9. The apparatus of claim 2, wherein the housing is mounted so that the axis of the absorption mixing chamber and those of the first inlet conduit means, the first outlet conduit means and the third conduit means are inclined towards the vertical.

10. The apparatus of claim 9, wherein the inclination of the absorption mixing chamber towards the vertical is such that the third conduit means leads away, obliquely, in the downward direction.

References Cited
UNITED STATES PATENTS

| | | | |
|---|---|---|---|
| 2,559,090 | 7/1951 | Potter | 23—253 U X |
| 2,876,189 | 3/1959 | Spracklen et al. | 23—253 X |
| 3,109,714 | 11/1963 | Skeggs | 23—253 |

MORRIS O. WOLK, Primary Examiner

R. M. REESE, Assistant Examiner